(12) United States Patent
Jin

(10) Patent No.: US 9,032,983 B2
(45) Date of Patent: May 19, 2015

(54) CONNECTOR DEVICE FOR A FOLDABLE TENT

(71) Applicant: Ki Ho Jin, Xiamen (CN)

(72) Inventor: Ki Ho Jin, Xiamen (CN)

( * ) Notice: Subject to any disclaimer, the term of this patent is extended or adjusted under 35 U.S.C. 154(b) by 23 days.

(21) Appl. No.: 13/867,675

(22) Filed: Apr. 22, 2013

(65) Prior Publication Data

US 2014/0137913 A1    May 22, 2014

(30) Foreign Application Priority Data

Nov. 21, 2012  (CN) ...................... 2012 2 0619356 U
Mar. 11, 2013  (CN) ...................... 2013 2 0108463 U

(51) Int. Cl.
| | | |
|---|---|---|
| *E04H 15/32* | (2006.01) | |
| *E04H 15/60* | (2006.01) | |
| *E04H 15/48* | (2006.01) | |
| *F16C 11/04* | (2006.01) | |

(52) U.S. Cl.
CPC ................ *E04H 15/48* (2013.01); *E04H 15/60* (2013.01); *F16C 11/04* (2013.01); *Y10S 135/909* (2013.01)

(58) Field of Classification Search
USPC ........... 135/139, 144, 120.3, 909; 403/91, 92, 403/93, 94, 96, 97, 98, 102; 16/324, 326
See application file for complete search history.

(56) References Cited

U.S. PATENT DOCUMENTS

| | | | |
|---|---|---|---|
| 1,639,009 A * | 8/1927 | Singley ............................ 403/95 |
| 1,798,163 A * | 3/1931 | Krenzke ......................... 403/95 |
| 3,187,373 A * | 6/1965 | Fisher .............................. 16/324 |
| 3,801,208 A * | 4/1974 | Bourgraf et al. ................ 403/95 |
| 4,736,490 A * | 4/1988 | Wesselski ....................... 16/292 |
| 4,750,509 A | 6/1988 | Kim |
| 4,756,712 A | 7/1988 | Clover, Jr. |
| 5,195,551 A | 3/1993 | Ju |
| 5,615,427 A * | 4/1997 | Huang ............................. 5/99.1 |
| 5,666,986 A | 9/1997 | Fox |
| 5,685,660 A * | 11/1997 | Liao ............................. 403/102 |
| 5,884,646 A | 3/1999 | Ju |
| 6,200,060 B1 | 3/2001 | Vernay |
| 6,238,125 B1 * | 5/2001 | Lin ............................... 403/102 |
| 6,397,433 B1 | 6/2002 | Chen |

(Continued)

FOREIGN PATENT DOCUMENTS

GB          2423096 A        8/2006

OTHER PUBLICATIONS

Canada Intellectual Property Office, Examiner's Report in counterpart Canada App. No. 2,813,979, Aug. 26, 2014 (3 pages).

*Primary Examiner* — Noah Chandler Hawk
(74) *Attorney, Agent, or Firm* — John H. Choi

(57) ABSTRACT

A connector device includes a male component pivotally coupled with a female component. The male component includes a projection extending from a first pole, with the projection having a first locking member. The female component includes a housing extending from a second pole, with the housing including a spring-biased engaging member and a second locking member at an upper portion of the housing. The male and female components are in a locked state when the engaging member is biased upward and the first and second locking members are engaged such that the first and second poles are fixedly aligned. The male and female components are in an unlocked state when the engaging member is biased downward and the first and second locking members are disengaged such that the first and second poles are pivotally movable with respect to each other.

6 Claims, 8 Drawing Sheets

(56) References Cited

U.S. PATENT DOCUMENTS

| | | | |
|---|---|---|---|
| 6,485,216 B1 * | 11/2002 | Cheng | 403/102 |
| 6,679,643 B1 | 1/2004 | Ham | |
| 6,772,780 B2 | 8/2004 | Price | |
| 7,003,849 B2 | 2/2006 | Cohen et al. | |
| 7,584,763 B2 * | 9/2009 | Yoon | 135/131 |
| 7,621,289 B2 | 11/2009 | Ju | |
| 7,942,159 B2 | 5/2011 | Choi | |
| 2006/0037636 A1 | 2/2006 | Lin | |
| 2006/0180190 A1 | 8/2006 | Ju | |
| 2007/0051399 A1 | 3/2007 | Jung | |
| 2011/0297201 A1 | 12/2011 | Chen | |

\* cited by examiner

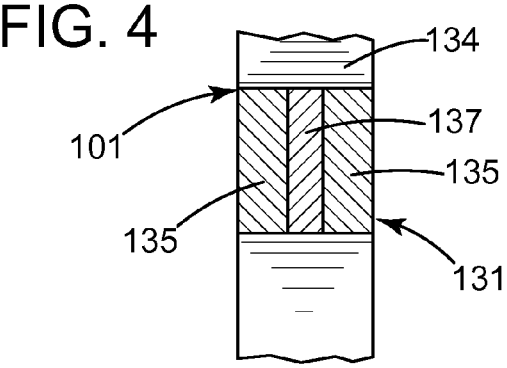
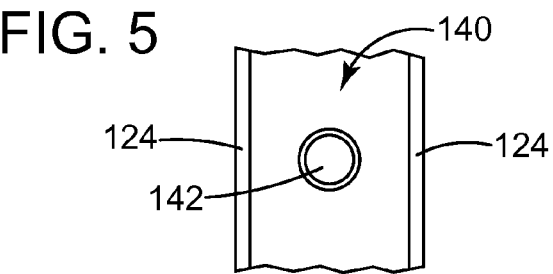
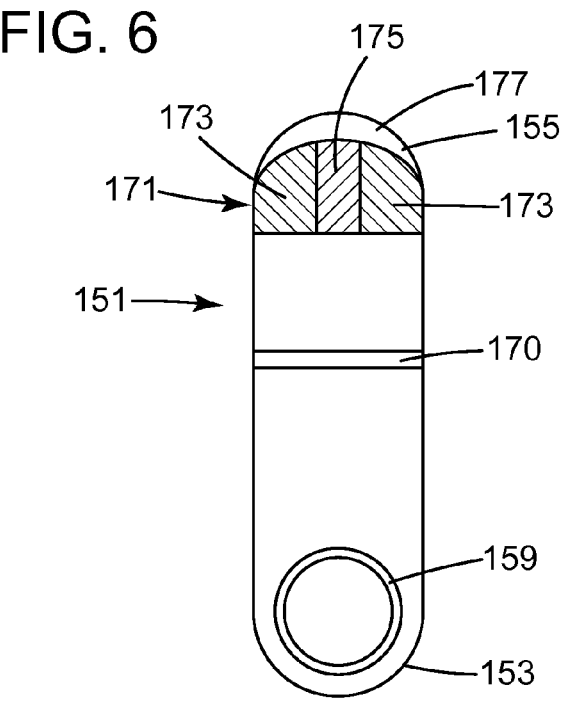

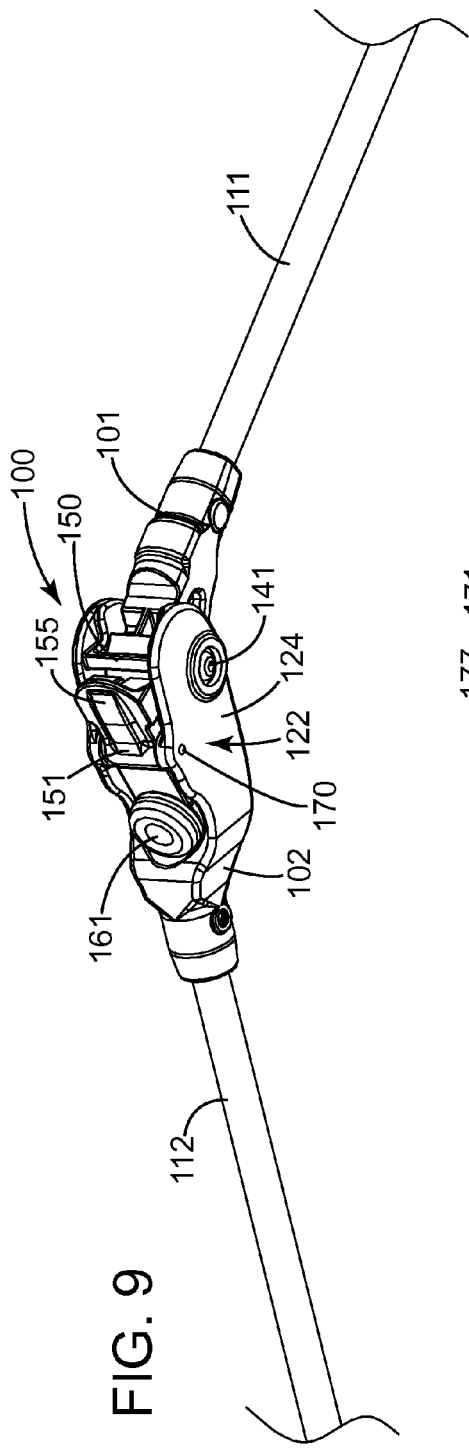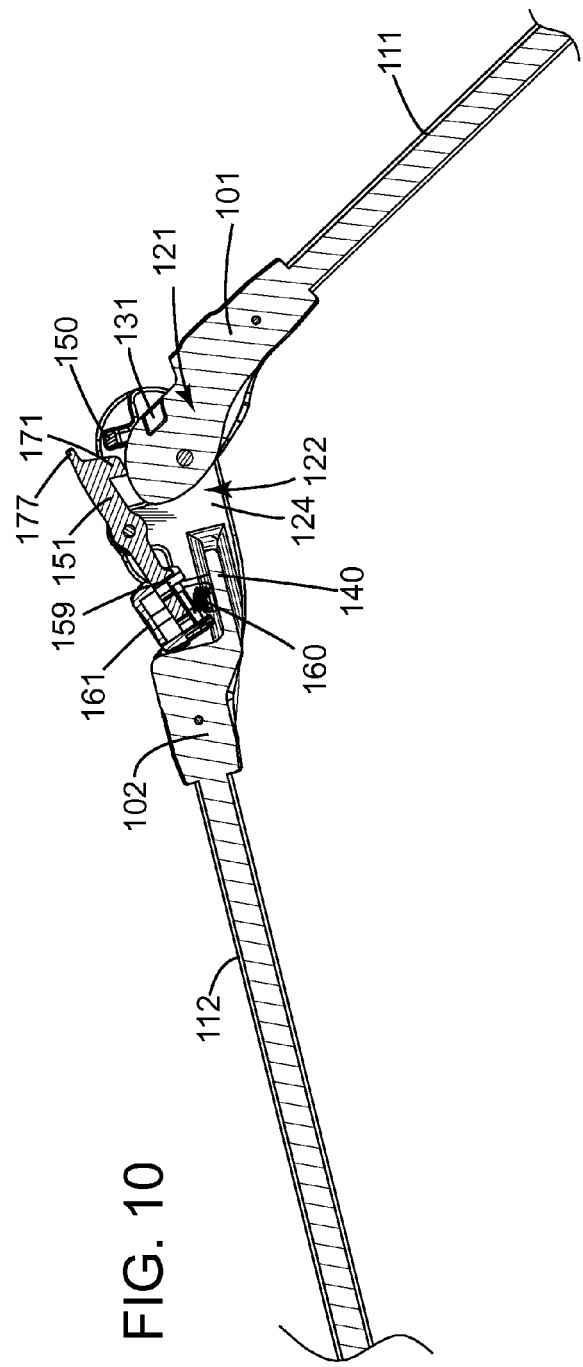

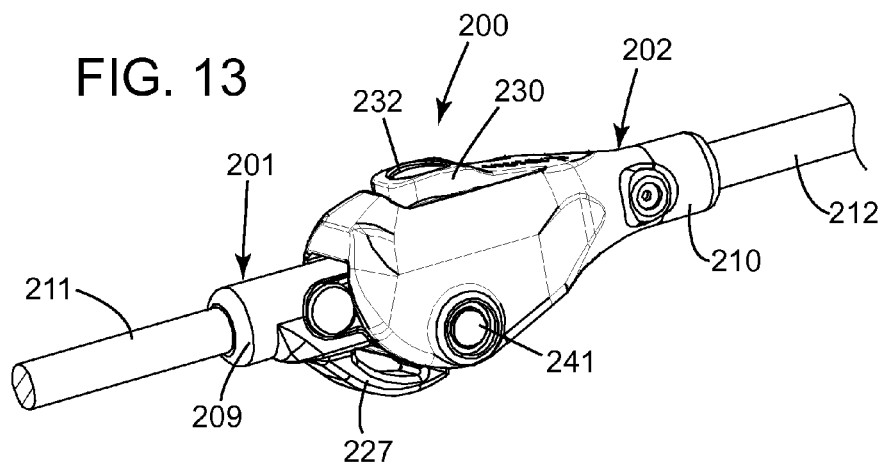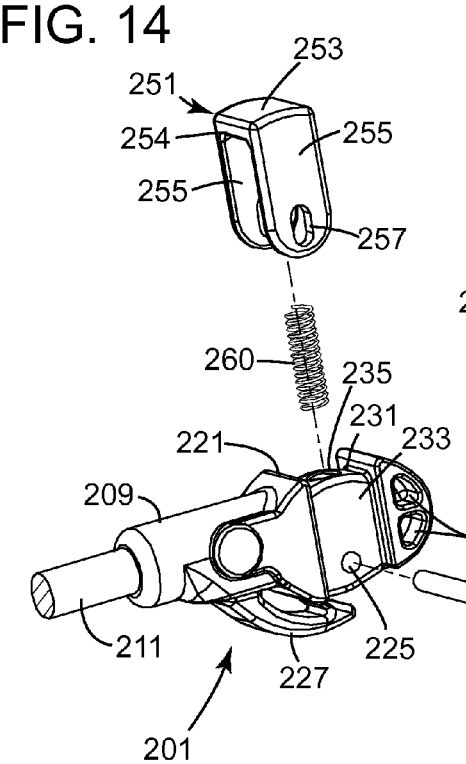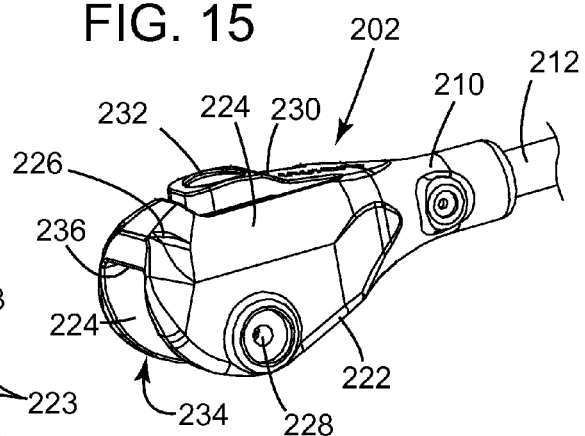

CONNECTOR DEVICE FOR A FOLDABLE TENT

CROSS REFERENCES TO RELATED APPLICATIONS

This application claims foreign priority to China Patent Application Nos. 201220619356.X (filed Nov. 21, 2012) and 201320108463.0 (filed Mar. 11, 2013), which are incorporated by reference in their entireties.

BACKGROUND OF THE INVENTION

The present invention relates to a connector device, and more particularly to a locking joint assembly for retaining a pair of pivotally connected poles of a foldable tent.

Camping is a popular recreational activity often employing the use of tents or tent like structures. Owing to the economical and practical set-up aspects, as well as portability, tents are frequently utilized by nature enthusiasts and amateur campers alike. Generally, tents are constructed of a sheet of fabric or material draped over or attached to a frame consisting of poles and supporting rope. Smaller tents are generally freestanding or secured to the ground, while large tents are generally anchored using guy ropes tied to tent pegs or stakes.

Conventional tent set-up, for both small and large tents, often require time consuming assembly for use, especially when taking into account the number of poles involved and the anchoring requirements, and fabric placement in securing the tent structure. Assembly efforts can become even more difficult during twilight or night hours when lighting is poor, or during inclement weather. Disassembly of the convention tent structure yields the same problems, as well as the need to orderly dismantle the tent pieces.

A popular alternative to conventional tents include foldable or pop-up tents. These tents are commonly referred to as "instant tents," "one-touch tents" or "pop-up tents," and erecting and collapsing the tent is easy and less time consuming than conventional assemble-to-use tents. Generally the cover and frame assembly of foldable tents are permanently attached to each other, i.e., preassembled. Instant tents are particularly advantageous for smaller tents because a minimal number of poles, typically four, are required and thus erecting and collapsing the instant tent is quite simple. Each pole is collapsible retractably and/or foldably. The foldably collapsible portions of the pole include a joint for pivoting adjacent pole sections.

In the prior art, pivoting joints are difficult to lock into place, and consequently, users often become frustrated when trying to erect or set-up the tent. In turn, when collapsing of the tent structure, this frustration is revisited owing to the difficulty in unlocking the joints and pivoting the poles into a collapsed position. Typically the joints must be manually snapped and locked into place, making it cumbersome for the user as he/she must stretch to reach the joint. Even still, many of the joints require numerous internal moving parts, making the joints vulnerable to mechanical damage over time. Costs in manufacturing are also increased owing to the several moving parts, increasing material costs and manpower necessary to assemble the variety of mechanical intricacies.

Pivoting joints in the prior art are also unreliable for having a continuously secure connection when the tent is in an open configuration. This is especially evident in pivoting joints used to connect adjacent sections of flexible fiberglass poles, which, because of the elastic nature of the pole sections, make it more difficult to maintain the pole sections in alignment.

Other problems associated with current connectors or locking pivot joints concern overall alignment of the connecting joints and the respective tent poles. In the event that a portion of the pole is rotatably displaced even slightly along a longitudinal axis of the pole, that displacement is transferred throughout the pole and overall alignment is affected, causing the joints to falter. For example, even with a small rotatable displacement at the upper portion of the pole, the displacement at the lower portion of the pole is magnified because of the length of the pole. This effect is particularly critical for the pole joint or connector device which couples the pole sections as the connector device connecting pole sections at a mid or lower portion of the pole are susceptible to misalignment. With the overall mechanical weaknesses of the mechanical joints, owing to the several moving parts and manual locking and aligning characteristics, shift of the connector device or joint misalignment causes jamming or damage to the connection joint. Once the connection joint or pivot joint is damaged, the foldable tent is virtually unusable.

OBJECTS AND SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

The present invention is intended to overcome at least the above-described disadvantages. The objects and advantages of the present invention, more specifically, are to provide a locking joint or connector device that will remain aligned when the tent is opened and collapsed and that spring locks into place without manipulation during set-up and unlocks easily with the push of a button during collapsing making the instant tent user friendly, convenient, and reducing risk of damage of the connector device over the tent's use life.

Facilitating the above-mentioned objectives, the subject invention generally provides a connector device for retaining a pair of pivotally connected poles, the connector device comprising: a male component comprising: a first cavity configured to fixedly retain a first pole; and a projection extending from the first cavity opposite the first pole, a top portion of the projection comprising a first locking member; a female component comprising: a second cavity configured to fixedly retain a second pole; and a housing extending from the second cavity opposite the second pole, a top portion of the housing including an engaging member, a second locking member disposed on a top portion of an outer end of said housing; and a biasing member coupled to the engaging member; wherein the projection and biasing member are positioned within the housing, the projection being pivotally coupled to the housing; the male and female components are in a locked state when the engaging member is biased upward while the biasing member is in a compressed state and the first and second locking members are engaged such that the first and second poles are fixedly aligned; and the male and female components are in an unlocked state when the engaging member is biased downward while the biasing member is in a more compressed state and the first and second locking members are disengaged such that the first and second poles are pivotally movable with respect to each other.

In one aspect of the present invention, the connector device is provided with a male component comprising: a first cavity configured to fixedly retain a first pole; and a projection extending from the first cavity opposite the first pole, an upper portion of said projection having a first locking member, a first aperture extending axially through the projection; a female component comprising: a second cavity configured to fixedly retain a second pole; and a housing extending from the second cavity opposite the second pole, the housing having a pair of opposing substantially vertical walls, each wall being spaced apart and in substantial parallel arrangement with respect to the other to form an opening for receiving the male component projection, lower portions of each wall having a second aperture extending axially and substantially aligned with each other, upper portions of each wall having a third aperture extending axially and substantially aligned with each other, a base extending outwardly and longitudinally from a lower portion of the housing substantially perpendicular to the pair of opposing walls, the base having a support member extending upwardly therefrom, wherein the male and female components are pivotally coupled together along a first axis formed by the first and second apertures; a biasing member having an upper end and a lower end, the biasing member lower end supported by the support member of the base; and an engaging member having an inner end and an outer end, said inner end having an engaging portion, said engaging portion substantially aligned with and configured to receive the biasing member upper end, a bottom portion of the engaging member outer end having a second locking member, a fourth aperture extending axially through the engaging member between the inner and outer ends, wherein the engaging member and female component are pivotally coupled together along a second axis formed by the third and fourth apertures; wherein the male and female components are locked such the first and second poles are fixed in a substantially aligned configuration when the engaging portion is biased upward such that the first and second locking members are engaged; and the male and female components are unlocked such that the first and second poles are pivotally movable when the engaging portion is depressed and the first and second locking members are disengaged.

In another aspect of the present invention, the connector device is provided with a male component comprising: a first cavity configured to fixedly retain a first pole; and a projection extending from the first cavity opposite the first pole, a top portion of said projection having a transversely extending upper groove and a side groove extending downwardly from each end of the upper groove, a retaining hole extending downward from the upper groove, a first aperture extending axially through the opposing side grooves; a biasing member having an upper end and a lower end, the biasing member positioned within the retaining hole such that said lower end is supported by a bottom surface of the retaining hole and said upper end is extended above the upper groove; a locking member having a top member and a side member extending downwardly from each end of the top member to form a substantial U-shape, each side member having a second aperture and each second aperture being elongated and substantially aligned axially, the locking member positioned on the male component projection such that the top member is engaged with the biasing member upper end, and each side member is slidably engaged with corresponding side grooves; and a female component comprising: a second cavity configured to fixedly retain a second pole; and a housing extending from the second cavity opposite the second pole, the housing having an inner end and an outer end, a pair of opposing substantially vertical side walls extending from said inner end to said outer end, each side wall being spaced apart and in substantial parallel arrangement with respect to the other, the side walls being connected by a front wall extending transversely at said outer end, lower portions of each side wall having a third aperture extending axially and substantially aligned with each other, a top portion of the housing including an engaging member extending outwardly between the side walls, the engaging member having an engaging portion substantially aligned with the biasing member; wherein the projection and locking member are positioned within the housing, the projection, locking member and housing pivotally coupled together along an axis formed by the first, second and third apertures.

BRIEF DESCRIPTION OF THE DRAWINGS

To better understand the present invention, a more particular description of the invention will be rendered by reference to the appended drawings.

FIG. 4 is a partial top view of a locking member of the male component shown in FIG. 3;

FIG. 5 is a partial top view of a base portion of the female component shown in FIG. 2;

FIG. 6 is a bottom view of an engaging member shown in FIG. 2;

FIG. 9 is a perspective view of the connector device of FIG. 1 in a first unlocked state;

FIG. 10 is a cross-sectional view of FIG. 9;

FIG. 13 is a perspective view of another embodiment of a connector device of the present invention in a locked state;

FIG. 14 is an exploded view of a male portion of the connector device of FIG. 13;

FIG. 15 is a perspective view of a female portion of the connector device of FIG. 13;

Figure 1:
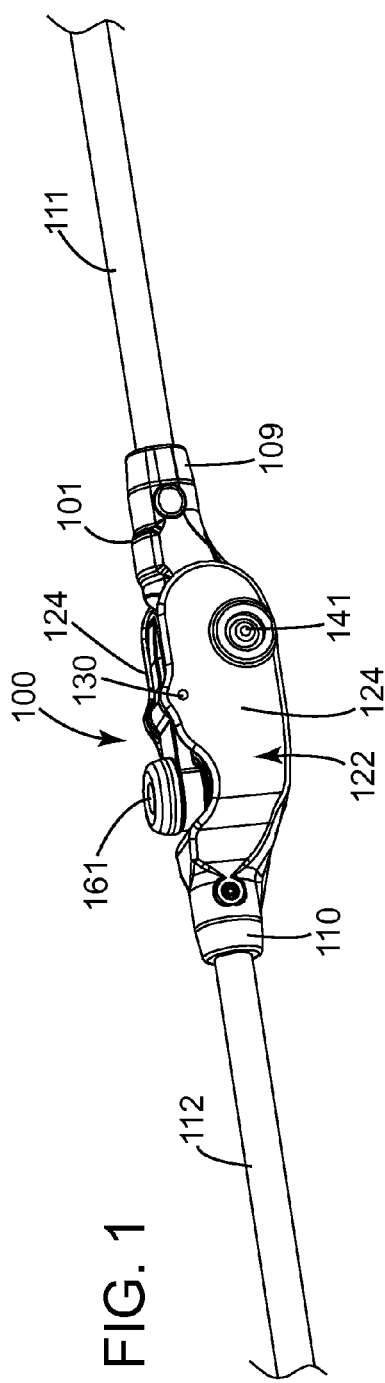
FIG. 1 is a side perspective view of an embodiment of a connector device of the present invention in a locked state.

To facilitate an understanding of the invention, identical reference numerals have been used, when appropriate, to designate the same or similar elements that are common to the figures. Further, unless stated otherwise, the features shown in the figures are not drawn to scale, but are shown for illustrative purposes only.

DETAILED DESCRIPTION OF THE INVENTION

Certain terminology is used in the following description for convenience only and is not limiting. To assist in the description of the present invention, words such as "top," "bottom," "upper," "lower," "front," "rear," "inner," "outer," "right" and "left" designate directions in the drawings to which reference is made and are used to describe the accompanying figures. The article "a" is intended to include one or more items. Where only one item is intended, the term "one" or similar language is used. The terminology includes the words above specifically mentioned, derivatives thereof, and words of similar import.

Referring to the drawings, two embodiments of a connector device 100, 200 of the present invention are shown. The connector device 100, 200 has particular applications and use as a means for retaining a pair of pivotally connected poles for a tent, particularly for a foldable tent.

First Embodiment

Figure 3:
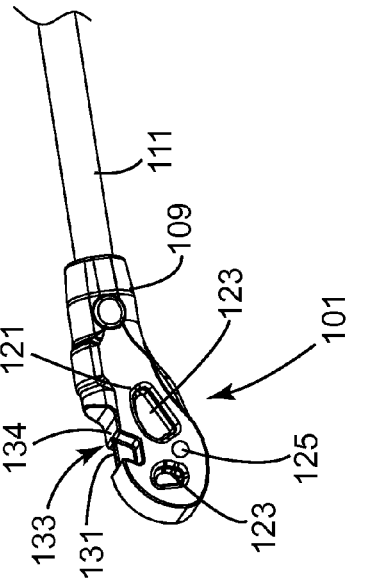
FIG. 3 is a side perspective view of a male component of the connector device of FIG. 1.
Figure 2:
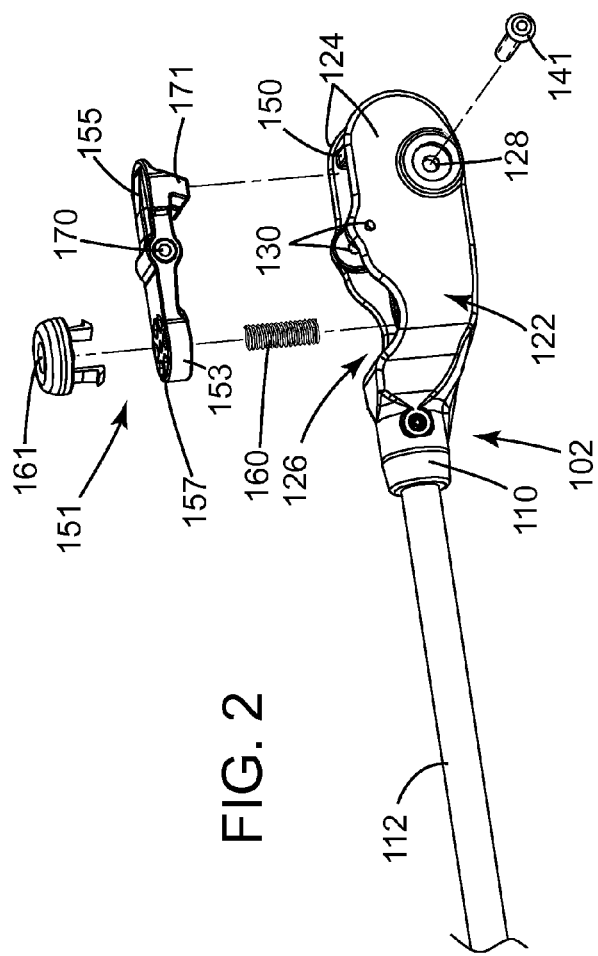
FIG. 2 is an exploded view of a female component of the connector device of FIG. 1.
Figure 7:
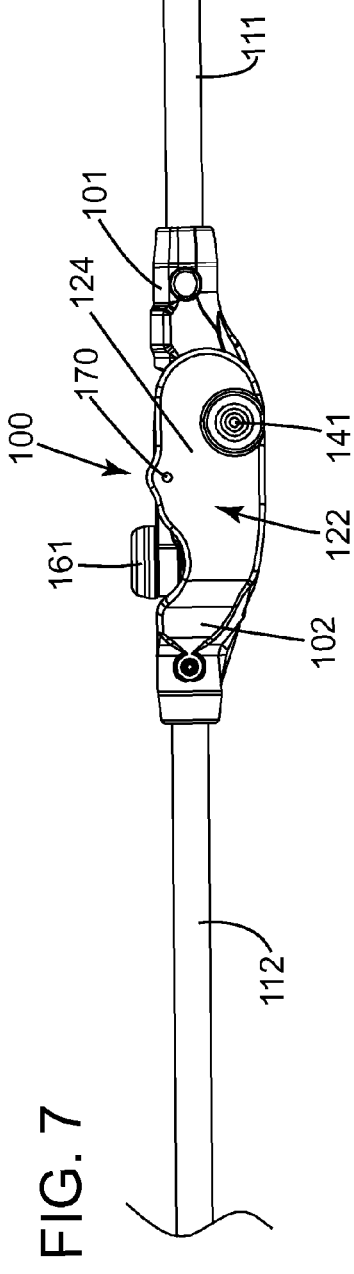
FIG. 7 is a side view of the connector device shown in FIG. 1 in a locked state.

Referring to FIGS. 1-12, a first embodiment of a connector device 100 of the present invention is shown. As shown in FIGS. 1-3, the connector device 100, in general, includes a male component 101 pivotally coupled to a female component 102.

Referring to FIGS. 3 and 4, the male component 101 includes a first cavity portion 109 for fixedly retaining a first pole 111. The first pole 111 could be any type of tent pole, including non-flexible poles constructed of a hollow, tubular metal or flexible poles constructed of fiberglass or the like. The first pole 111 is fixed within the first cavity portion 109 by a screw but other means could be used such as adhesive, form-fit, other fasteners or any combination thereof. The male component 101 also includes a projection 121 which extends longitudinally from the cavity 109 opposite the first pole 111. In this embodiment, the projection 121 includes a plurality of indents 123 which are intentionally formed during the plastic molding process. The inclusion of indents 123 not only saves in material cost but also aids in distributing the stresses on the projection 121, thereby reducing the possibility of cracking or otherwise failing due to overstress. However, the projection 121 could be constructed without indents and instead have level surfaces without departing from the spirit and scope of the invention. The projection 121 also includes a first aperture 125 which extends through the projection 121 transversely. An upper portion 133 of the projection 121 includes a substantially flat surface 134 which connects to a first locking member 131 which extends transversely through the projection 121. As shown in FIG. 4, the first locking member 131 includes a pair of downwardly extending first grooves 135 forming an upwardly extending first ridge 137 therebetween. The grooves 135 and ridge 137 are formed integrally with the projection 121 during the molding process and are sufficiently rigid for added strength and durability.

Figure 8:
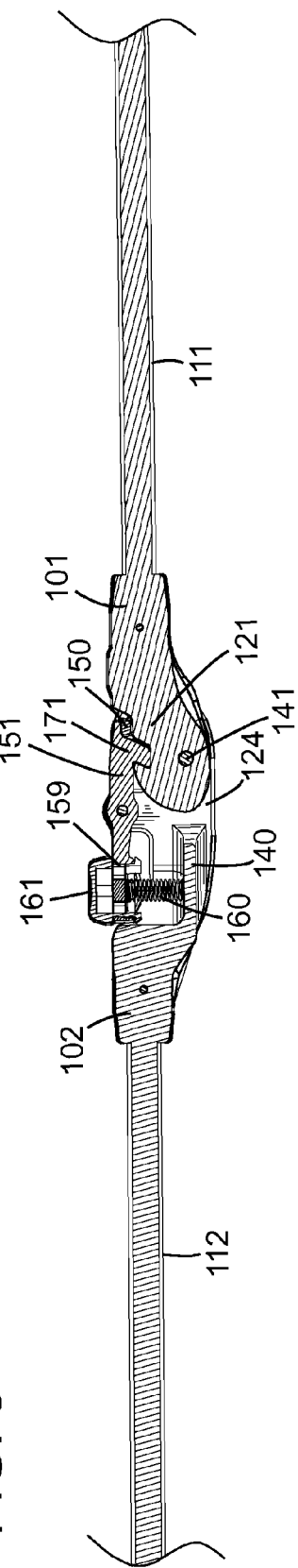
FIG. 8 is a cross-sectional view of FIG. 7.

Referring to FIGS. 1, 2 and 5, the female component 102 of the connector device 100 includes a second cavity portion 110 for retaining a second pole 112. As mentioned above, the second pole 112 could also be any type of tent pole, including non-flexible poles constructed of a hollow, tubular metal or flexible poles constructed of fiberglass or the like. The second pole 112 is fixed within the second cavity portion 110 by a screw but other means could be used such as adhesive, form-fit, other fasteners or any combination thereof. A housing 122 extends longitudinally from the second cavity portion 110 opposite the second pole 112. The housing 122 includes a pair of opposing substantially vertical walls 124. The walls 124 are spaced apart and in substantial parallel arrangement with respect to each other. The walls 124 form an opening 126 for receiving the male component projection 121. Lower portions of each wall 124 have a second aperture 128 extending transversely and are substantially aligned with each other, while upper portions of each wall 124 include a third aperture 130 extending transversely and are substantially aligned with each other. Referring to FIGS. 5, 8 and 10, the female component 102 further includes a base 140 extending outwardly and longitudinally from a lower portion of the housing 122. The base 140 is positioned between the pair of opposing walls 124 and substantially perpendicular thereto. Referring to FIG. 5, the base 140 includes a support member 142 which extends upwardly. In the preferred embodiment, the support member 142 is a cylindrical extension having a space between the cylinder walls. However, the support member 142 could take on other forms such as an upwardly extending rod or pin. In the preferred embodiment, the walls 124 extend below the base 140 as shown for example in FIGS. 8, 10 and 12, to form a retaining space for the male component 101 such that when the poles 111, 112 are fully folded the folded connector device 100 is compact and the poles 111, 112 are in a substantially parallel relationship, as shown in FIG. 12. Referring to FIGS. 2 and 9-12, the female component 102 also includes a transverse support member or stopper 150 extending transversely between the opposing walls 124 at an outer end of the housing 122, which is integrally formed with the housing 122 during the plastic molding process. The stopper 150 provides additional overall support to the female component 102 while also functioning as a means to limit the movement of an engaging member 151 and the male component 101 which is described in more detail below. The male and female components 101, 102 are pivotally coupled together along a first axis formed by the first and second apertures 125, 128 by a fastener 141. In the preferred embodiment, the fastener 141 is a rivet but other types of fasteners such as a nut and bolt combination, or screws could be used without departing from the spirit and scope of the invention.

Referring to FIG. 2, the connector device 100 also includes a biasing member 160 having an upper end and a lower end. In the preferred embodiment, the biasing member 160 is a spring, and more specifically a spring with moderate elasticity to withstand wear and tear and minimize deformation. However, other biasing members such as two coinciding springs or different types of spring clips could be used without departing from the spirit and scope of the present invention. The biasing member 160 lower end is supported by the support member 142 of the base 140, i.e., positioned within the cylinder walls. Alternatively, when the support member 142 is an upwardly extending pin, the biasing member 160 is secured on the pin.

Referring to FIGS. 1, 2 and 6, the connector device 100 further includes an engaging member 151. The engaging member 151 is one integral piece and is constructed of a tough, rigid plastic formed by injection molding. The engaging member 151 is generally an elongated plate having an inner end 153 and an outer end 155. A top portion of the inner end 153 includes an engaging portion 157 which is substantially aligned with the biasing member 160. In the preferred embodiment, a push button 161 is fixedly attached to the engaging portion 157 to provide an indication of an engagement point and also to provide additional comfort to the user. As shown in FIG. 6, a bottom portion of the engaging portion 157 includes a cylindrical extension 159 which is configured to receive the biasing member 160 upper end. Alternatively, the cylindrical extension 159 could be replaced with a downwardly extending pin. A bottom portion of the engaging member outer end 155 includes a second locking member 171. Referring to FIG. 6, in the preferred embodiment, the second locking member 171 includes a pair of spaced apart second ridges 173 that forms a second groove 175 therebetween. The first and second locking members 131, 171 are configured such that the first ridge 137 fits within the second groove 175 and the second ridges 173 fit within the first grooves 135. An outwardly extending lip 177 is formed at the engaging member 151 outer end. A fourth aperture 170 extends transversely through the engaging member 151 between the inner and outer ends 153, 155. The engaging member 151 and female component 102 are pivotally coupled together along a second axis formed by the third and fourth apertures 130, 170 and thus, the second axis acts as a fulcrum, i.e., when the engaging portion 157 is depressed the second locking member 171 is pivoted upward. However, pivotal movement of the engaging member 151 is limited by the stopper 150 as the lip 177 engages the stopper 150 to prevent further downward movement of the engaging member outer end 155.

Figure 11:
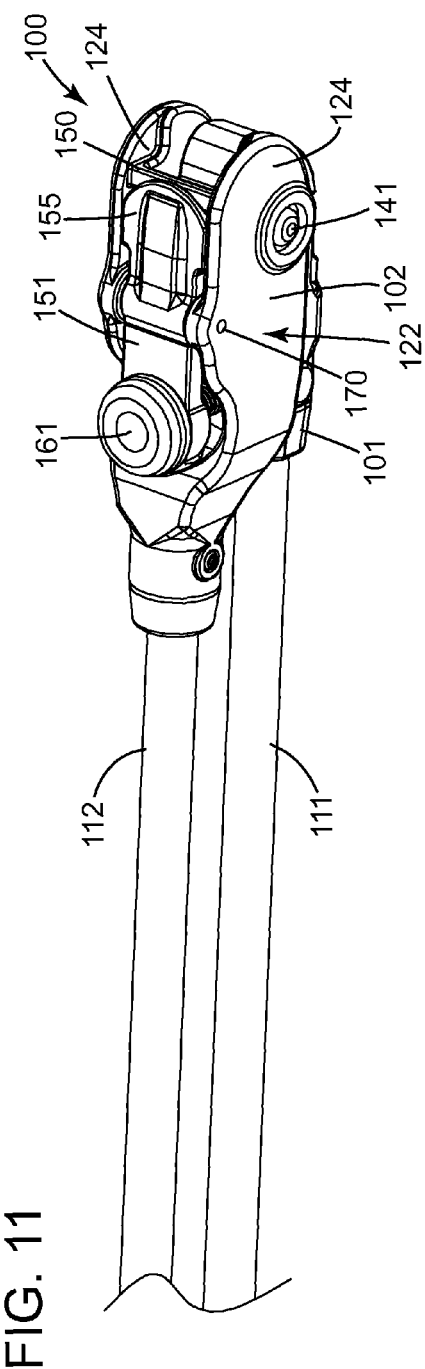
FIG. 11 is a perspective view of the connector device of FIG. 1 in a second unlocked state.
Figure 12:
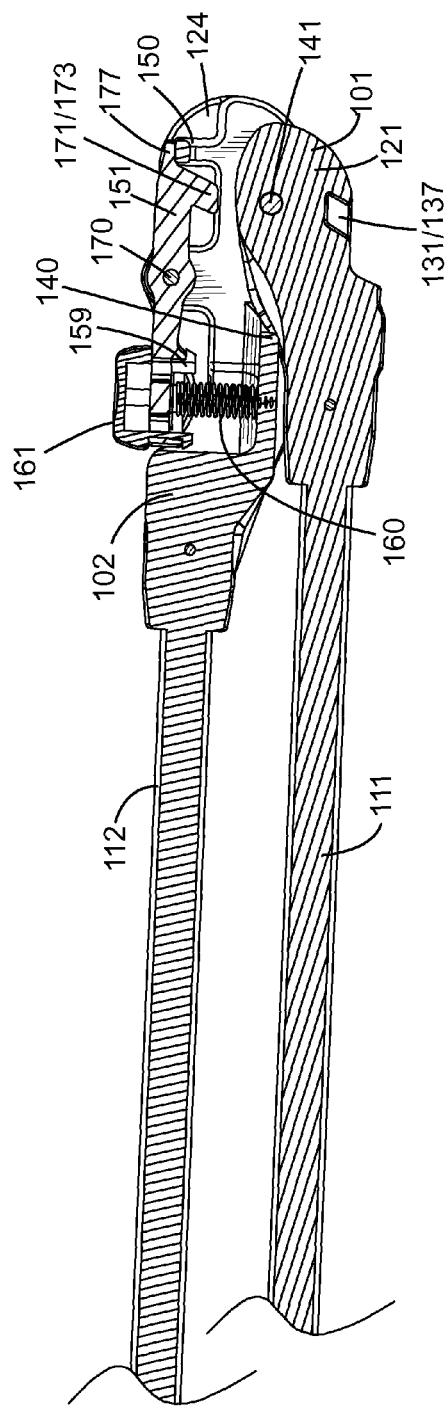
FIG. 12 is a cross-section view of FIG. 11.

Referring to FIGS. 7-12, in operation, the male and female components 101, 102 of the connector device 100 are in a locked state such the first and second poles 111, 112 are fixed in a substantially aligned configuration (FIGS. 7-8) when the engaging portion 157 is biased upward. The engaging member 151 is prevented from over-pivoting by the stopper 150. Furthermore, the flat surface 134 of the male component 101 engages a bottom portion of the stopper 150 and is prevented from over-pivoting. During this time, the first and second locking members 131, 171 are engaged. That is, the first ridge 137 is engaged with the second groove 175 and the second ridges 173 are engaged with the first grooves 135. To unlock the connector device 100 so that the first and second poles 111, 112 are pivotally movable (FIGS. 9-10), the engaging portion 157 is depressed and the first and second locking members 131, 171 are disengaged. The poles 111, 112 are pivoted downward to a position where the poles 111, 112 are substantially parallel and adjacent to each other (FIGS. 11-12).

The main components of the connector device 100, i.e., the male and female components 101, 102 and the engaging member 151 are preferably formed of a tough molded plastic but can also be constructed with other high-strength, resilient, light-weight materials and by other methods without departing from the spirit and scope of the invention. Also, one of ordinary skill in the art will recognize that the first and second locking members 131, 171 could have other configurations without departing from the spirit and scope of the invention. For example, the second locking member could be a single hook and the first locking member could be a single matching groove. In addition, the male and female components 101, 102 could include a hook or extension on a lower portion to provide a means for attaching an inner tent fabric, rain fly or accessories.

Second Embodiment

Referring to FIGS. 13-22, a second embodiment of a connector device 200 of the present invention is shown. In general, the connector device 200 includes a male component 201 pivotally connected with a female component 201. Both male and female components 201, 202 are constructed of a tough molded plastic but can also be constructed with other high-strength, resilient, light-weight materials and by other methods without departing from the spirit and scope of the invention.

Figure 16:
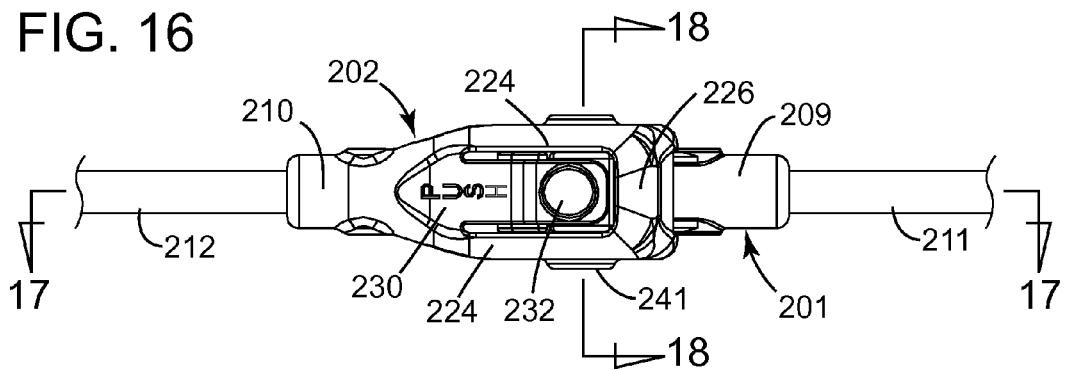
FIG. 16 is a top view of the connector device shown in FIG. 13.
Figure 17:
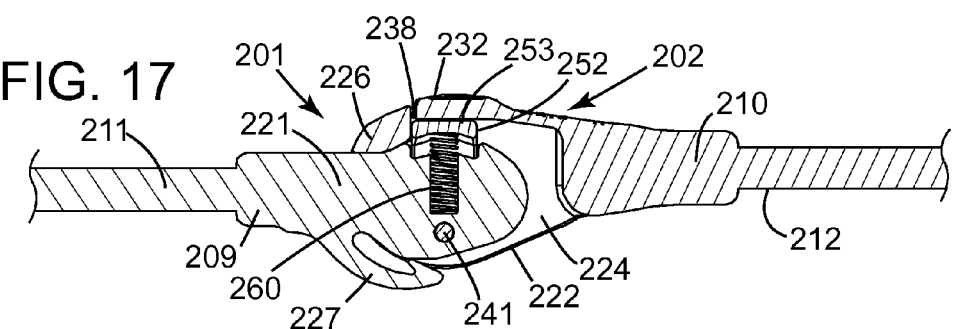
FIG. 17 is a sectional view of the connector device of FIG. 13 taken along the line "17-17" as indicated in FIG. 16.
Figure 18:
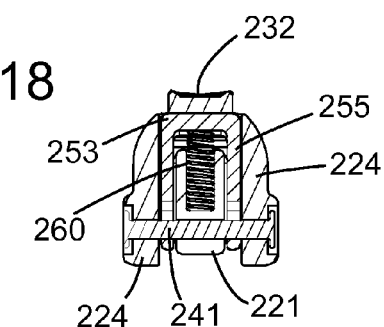
FIG. 18 is a sectional view of the connector device of FIG. 13 taken along the line "18-18" as indicated in FIG. 16.
Figure 19:
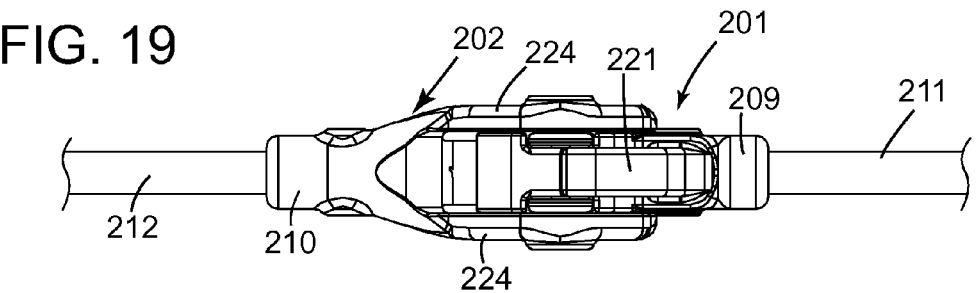
FIG. 19 is a bottom view of the connector device of FIG. 13.

Referring to FIGS. 13-21, the male component 201 includes a first end having a first cavity portion 209 for fixedly retaining a first pole 211. The first pole 211 could be any type of tent pole, including non-flexible poles constructed of a hollow, tubular metal or flexible poles constructed of fiberglass or the like. The first pole 211 is fixed within the first cavity portion 209 by a screw but other means could be used such as adhesive, form-fit, other fasteners or any combination thereof. The male component 201 also includes a projection 221 which extends longitudinally from the cavity 209 opposite the first pole 211. The projection 221 includes a plurality of indents 223 which are intentionally formed during the plastic molding process. The inclusion of indents 223 not only saves in material cost but also aids in distributing the stresses on the projection 221. The projection 221 also includes a first aperture 225 which extends through the projection 221 transversely. A top portion of the projection 221 includes a transversely extending upper groove 231 and a side groove 233 extending downwardly from each end of the upper groove 221. A substantially vertical retaining hole 235 extends downwardly from the upper groove 221 to a position above the first aperture 225, as shown in FIGS. 17 and 18. In the preferred embodiment, the retaining hole 235 extends downward from the upper groove 231 substantially parallel to the side grooves 221. The preferred embodiment also includes a hook 227 which extends from a bottom portion of the projection 221. The hook 227 could be used for attaching a tent fabric, rain fly or other accessories.

Referring to FIG. 14, the connector device 200 also includes a biasing member 260 having an upper end and a lower end. The biasing member 260 is positioned within the retaining hole 235 such that the lower end is supported by a bottom surface (not shown) of the retaining hole 235 and the upper end is extended above the upper groove 231. In the preferred embodiment, the biasing member 260 is a substantially rigid spring with moderate elasticity to withstand wear and tear and minimize deformation. However, other biasing members such as two coinciding springs or different types of spring clips could be used without departing from the spirit and scope of the present invention.

Figure 22:
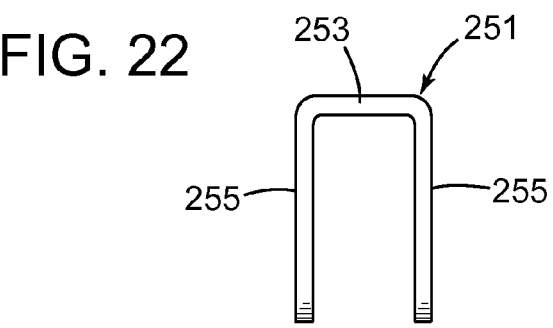
FIG. 22 is a front view an engaging member shown in FIG. 14.

Referring to FIGS. 14 and 22, the connector device 200 also includes a locking member 251 having a top member 253 and a side member 255 extending downwardly from each end of the top member 253 to form a substantial U-shape. In the preferred embodiment, the locking member 251 is constructed of steel but other metals and other materials such as a hard and tough plastic could be used. An inner edge 252 of the top member 253 is substantially rounded while an outer edge 254 is substantially flat. Each side member 255 includes an elongated second aperture 257 substantially aligned transversely. The second aperture 257 is configured such that the length is greater than or equal to a displacement of the locking member 251 between locked and unlocked states. Referring to FIGS. 17 and 18, the locking member 251 is positioned on the male component projection 221 such that the top member 253 is engaged with the biasing member 260 upper end and each side member 255 is slidably engaged with corresponding side grooves 233.

Referring to FIG. 13-21, the female component 202 of the connector device 200 includes a first end having a second cavity portion 210 configured to fixedly retain a second pole 212. The second pole 212 could be any type of tent pole, including non-flexible poles constructed of a hollow, tubular metal or flexible poles constructed of fiberglass or the like. The second pole 212 is fixed within the second cavity portion 210 by a screw but other means could be used such as adhesive, form-fit, other fasteners or any combination thereof. The female component 202 also includes a housing 222 which extends longitudinally from the second cavity 210 opposite the second pole 212. The housing 222 includes an inner end and an outer end. A pair of opposing substantially vertical side walls 224 extends from the inner end to the outer end.

Each side wall 224 is spaced apart and in substantial parallel arrangement with respect to the other. The side walls 224 are connected by a front wall 226 extending transversely at the outer end. A bottom surface 236 of the front wall 226 is inclined moving outward from the housing 222. Lower portions of each side wall 224 include a third aperture 228 extending transversely and substantially aligned with each other.

Referring to FIGS. 15 and 16, a top portion of the housing 222 includes an engaging member 230 extending outwardly from the second cavity 210 between the side walls 224. The engaging member 230 includes an engaging portion 232 substantially aligned with the locking member top member 253 and biasing member 260 when the connector device 200 is locked, as shown in FIG. 17. The engaging member 230 is configured such that an inner end is integrally attached to the inner end of the housing 222 but the sides and outer ends are detached from the side walls 224 and front wall 226, respectively, so that the engaging portion 234 is elastically movable downward. As shown in FIG. 16, the top portion of the engaging member 230 could include an inscription molded thereon during the plastic molding process to indicate the function of the engaging portion 232. The side walls 224, front wall 226 and engaging member 230 form an opening 234 for receiving the projection 221.

Figure 20:
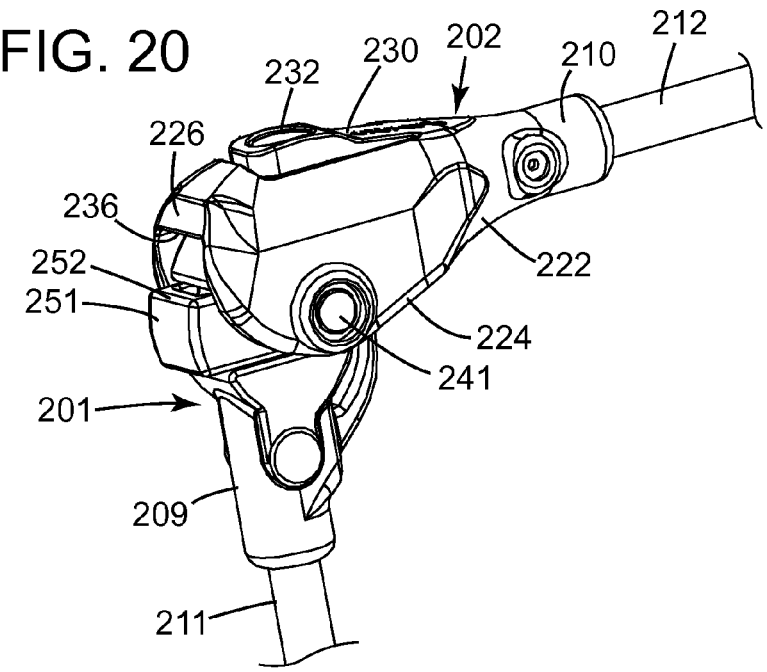
FIG. 20 is a side perspective view of the connector device of FIG. 13 in an unlocked state and in a partially folded configuration.
Figure 21:
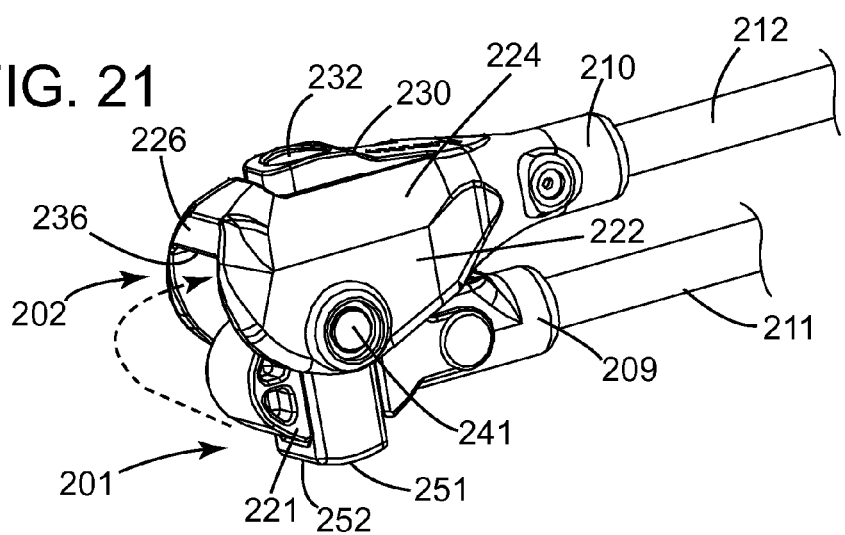
FIG. 21 is a side perspective view of the connector device of FIG. 11 in an unlocked state and in a fully folded configuration.

Referring to FIGS. 16-21, the projection 221 and locking member 251 are positioned within the housing 222 and pivotally coupled together along an axis formed by the first, second and third apertures 225, 257 and 228, preferably with a rivet 241. One of ordinary skill in the art will recognize that other fasteners could be used such as a nut and bolt combination, screw or the like. In the locked state, as shown for example in FIG. 17, the male and female components 201, 202 are locked such the first and second poles 211, 212 are fixed in a substantially aligned configuration. The locking member 251 is biased upward such that the top member 253 engages an inner surface 238 of the front wall 226 to prevent pivotal movement of the male and female components 201, 202. To unlock the male and female components 201, 202, the engaging portion 232 is engaged and depressed such that the biasing member 260 is compressed. The locking member 251 is moved downward such that the top member 253 is positioned within the upper groove 231. In this configuration, the projection 221 is free to pivot as the front wall 226 is no longer blocking the top member 253. The first and second poles 211, 212 are pivoted downward toward each other as the projection 221 and locking member 251 are collectively pivoted, as shown in FIGS. 20 and 21. In the preferred embodiment, each of the first and second poles 211, 212 are pivotable 180 degrees from their respective locked positions.

Referring to FIGS. 20 and 21, to return to the locked state, the first and second poles 211, 212 are pivoted toward each other, as shown in broken lines in FIG. 21. By virtue of the predetermined length of the second apertures 257, the locking member 251 is configured such that when the locking member 251 is upwardly biased the top member 253 does not extend above an outermost portion of the front wall bottom surface 236. The inclined bottom surface 236 of the front wall 226 and the rounded inner edge 252 smoothly guides the locking member 251 into the housing 222 as the locking member 251 is biased downward. When the locking member 251 moves inward beyond the front wall bottom surface 236, the top member 253 is biased upward and the flat outer edge 254 engages the inner surface of the front wall 238. In this position, the locking member 251 is positioned underneath and substantially aligned with the engaging portion 232, as shown in FIGS. 17 and 18.

The connector device of the present invention is a convenient means for retaining a pair of tent poles. The tent poles are securely locked and also easily unlocked with a simple push of the engaging member. The connector device could be used to lock tent pole sections in alignment on any portion of a foldable tent. As described above, the connector device of the present invention is a new, useful and much needed component for foldable tents.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A connector device for retaining a pair of pivotally connected poles, the connector device comprising:
   a male component comprising: a first end configured to fixedly retain a first pole; and a projection extending from said first end opposite the first pole, a top portion of said projection having a transversely extending upper groove and a side groove extending downwardly from each end of the upper groove, a retaining hole extending downward from the upper groove, a first aperture extending axially through the opposing side grooves;
   a biasing member having an upper end and a lower end, the biasing member positioned within the retaining hole such that said lower end is supported by a bottom surface of the retaining hole and said upper end is extended above the upper groove;
   a locking member having a top member and a side member extending downwardly from each end of the top member to form a substantial U-shape, each side member having a second aperture, each second aperture being elongated and substantially aligned axially, the locking member positioned on the male component projection such that the top member is engaged with the biasing member upper end, and each side member is slidably engaged with corresponding side grooves; and
   a female component comprising: a first end configured to fixedly retain a second pole; and a housing extending from said first end opposite the second pole, the housing having an inner end and an outer end, a pair of opposing substantially vertical side walls extending from said inner end to said outer end, each side wall being spaced apart and in substantial parallel arrangement with respect to the other, the side walls being connected by a front wall extending transversely at said outer end, lower portions of each side wall having a third aperture extending axially and substantially aligned with each other, a top portion of the housing including an engaging member extending between the side walls, the engaging member having an engaging portion substantially aligned with the biasing member;
   wherein the projection and locking member are positioned within the housing, the projection, locking member and housing pivotally coupled together along an axis formed by the first, second and third apertures.

2. The connector device of claim 1, wherein: in a locked state the male and female components are fixed in a substantially aligned configuration when the locking member is biased upward such that the top member engages an inner surface of the front wall to prevent pivotal movement of the male and female components; and in an unlocked state the male and female components are pivotably movable when the engaging portion is depressed and the locking member is moved downward such that the top member is positioned within the top groove.

3. The connector device of claim 2, wherein each of the second apertures have a length greater than or equal to a displacement of the locking member between the locked and unlocked states.

4. The connector device of claim 1, wherein the retaining hole extends downward from the upper groove substantially parallel to the side grooves.

5. The connector device of claim 1, wherein the male component first end includes a cavity.

6. The connector device of claim 1, wherein the female component first end includes a cavity.

\* \* \* \* \*